(12) United States Patent
Kamiya et al.

(10) Patent No.: US 10,041,562 B2
(45) Date of Patent: Aug. 7, 2018

(54) SEALING STRUCTURE

(71) Applicant: NOK CORPORATION, Tokyo (JP)

(72) Inventors: Yusuke Kamiya, Fukushima (JP); Hiroki Matsui, Fukushima (JP); Shinya Omoto, Tottori (JP); Toru Nakashima, Tottori (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/504,533

(22) PCT Filed: Aug. 7, 2015

(86) PCT No.: PCT/JP2015/072462
§ 371 (c)(1),
(2) Date: Feb. 16, 2017

(87) PCT Pub. No.: WO2016/027696
PCT Pub. Date: Feb. 25, 2016

(65) Prior Publication Data
US 2017/0234398 A1 Aug. 17, 2017

(30) Foreign Application Priority Data

Aug. 20, 2014 (JP) .................................. 2014-167169

(51) Int. Cl.
*F16J 15/32* (2016.01)
*F16F 15/126* (2006.01)
(Continued)

(52) U.S. Cl.
CPC .......... *F16F 15/126* (2013.01); *F16J 15/3208* (2013.01); *F16J 15/3232* (2013.01)

(58) Field of Classification Search
CPC .... F16F 15/126; F16J 15/3208; F16J 15/3232
(Continued)

(56) References Cited

U.S. PATENT DOCUMENTS

| 3,391,940 | A | 7/1968 | Baugh | |
|---|---|---|---|---|
| 7,712,745 | B2* | 5/2010 | Clark | F16J 15/3256 277/551 |
| 8,474,825 | B2* | 7/2013 | Nakagawa | F16J 15/164 277/353 |
| 2011/0221140 | A1* | 9/2011 | Nakagawa | F16J 15/164 277/412 |
| 2014/0339775 | A1 | 11/2014 | Yarimizu et al. | |

(Continued)

FOREIGN PATENT DOCUMENTS

| JP | S63196867 U | 12/1988 |
|---|---|---|
| JP | 03-020175 A | 1/1991 |

(Continued)

OTHER PUBLICATIONS

Korean Office Action dated Feb. 2, 2018 with English translation (corresponding to KR 10-2017-7004273).

(Continued)

*Primary Examiner* — Nathan Cumar
(74) *Attorney, Agent, or Firm* — Harness, Dickey & Pierce, P.L.C.

(57) ABSTRACT

A sealing structure allows for formation of a side lip, as well as a labyrinth structure between an oil seal and a torsional vibration damper, even when a reinforcing ring has a short inward flange part. The sealing body 120 includes a side lip 124 extending from near a distal end of an inward flange part 112 radially inward and further toward an air side (A) than a dust lip 122 to a position not as far as the outer circumferential surface of a tubular part 210. An annular member 250 is further provided, which is fixed to the outer circumferential surface of the tubular part 210 further on the air side (A) than the side lip 124 and covering an outer circumferential surface of the side lip 124 such that there is a gap between the annular member 250 itself and the outer circumferential surface of the side lip 124.

3 Claims, 3 Drawing Sheets

(51) Int. Cl.
*F16J 15/3232* (2016.01)
*F16J 15/3208* (2016.01)

(58) Field of Classification Search
USPC .......................................................... 277/562
See application file for complete search history.

(56) References Cited

U.S. PATENT DOCUMENTS

2015/0285379 A1    10/2015  Matsui et al.
2017/0234398 A1*    8/2017  Kamiya ................ F16F 15/126
                                                                  277/562

FOREIGN PATENT DOCUMENTS

| JP | 2002-276820 A | 9/2002 |
| JP | 2006-57825 A | 3/2006 |
| JP | 2010-014143 A | 1/2010 |
| JP | 2011-241891 A | 12/2011 |
| WO | 2010/061688 A1 | 6/2010 |
| WO | 2013/094251 A1 | 6/2013 |
| WO | 2014/021179 A1 | 2/2014 |

OTHER PUBLICATIONS

Extended European Search Report dated Mar. 22, 2018, (corresponding to EP15833463.1).
Chinese Office Action dated Sep. 30, 2017, with English translation (corresponding to CN201580044131.2).

* cited by examiner

SEALING STRUCTURE

CROSS-REFERENCE TO RELATED APPLICATIONS

This application is a National Stage of International Application No. PCT/JP2015/072462, filed Aug. 7, 2015 (now WO 2016/027696A1), which claims priority to Japanese Application No. 2014-167169, filed Aug. 20, 2014. The entire disclosures of each of the above applications are incorporated herein by reference.

FIELD

The present disclosure relates to a sealing structure that has a torsional vibration damper.

BACKGROUND

In a sealing structure that has a torsional vibration damper and an oil seal, a technique of providing a labyrinth structure has hitherto been known for minimizing entrance of foreign substances from outside. One example of such a structure will be described with reference to FIG. 3. FIG. 3 is a schematic cross-sectional view of a sealing structure according to a prior art example.

As shown in the figure, the torsional vibration damper 600 includes a tubular part 610 that is attached to a crankshaft 300. The oil seal 500 includes a reinforcing ring 510 and a sealing body 520 made of an elastic material and formed integrally with the reinforcing ring 510. The reinforcing ring 510 includes a cylindrical part 511, and an inward flange part 512 provided at an end on the opposite side from the sealed-fluid side of this cylindrical part 511. The sealing body 520 includes an oil lip 521 provided such as to be slidable on an outer circumferential surface of the tubular part 610, and a dust lip 522 provided further on the opposite side from the sealed-fluid side than the oil lip 521 and slidable on the outer circumferential surface of the tubular part 610.

In addition, a side lip 523 is provided to the sealing body 520 in this prior art example. This side lip 523 is configured to increase in diameter toward the opposite side from the sealed-fluid side so that foreign substances do not enter the sliding part between the dust lip 522 and the outer circumferential surface of the tubular part 610 from the air side. An annular groove 621 is formed in a body part 620 of the torsional vibration damper 600, and the side lip 523 is disposed such as to extend into this annular groove 621. This way, a confined and complex path is formed from the air side to a sliding part between the dust lip 522 and the outer circumferential surface of the tubular part 610. A labyrinth structure is thus provided.

In some cases where there is only a small space available for mounting the oil seal 500, the inward flange part 512 of the reinforcing ring 510 has to be made shorter. In such cases, it may not be possible to adopt the side lip 523 configured as described above. The reason is explained below.

The oil seal 500 is obtained by insert-molding the sealing body 520, with the reinforcing ring 510 as the insert component. With this process, the sealing body 520 is formed with the reinforcing ring 510 being set in position in the metal mold, and the resultant sealing body 520 has an opening 524, which leads to an end face of the inward flange part 512 of the reinforcing ring 510 on the opposite side from the sealed-fluid side. That is, the opening 524 is formed in a portion corresponding to a support part (not shown) provided in the metal mold for the positioning purpose. Therefore, the portion on the end face of the inward flange part 512 of the reinforcing ring 510 on the opposite side from the sealed-fluid side is exposed. This exposed portion is utilized when mounting the oil seal 500. Namely, when mounting the oil seal 500, it is pressed with a jig or the like, but, since pressing the sealing body 520 that is made of an elastic material may damage or break the seal, the reinforcing ring 510 is pressed, through the opening 524.

If the inward flange part 512 of the reinforcing ring 510 is short and the side lip 523 is configured to increase in diameter toward the opposite side from the sealed-fluid side, the opening 524 may be blocked by the side lip 523. If this is the case, the reinforcing ring 510 cannot be pressed with a jig or the like through the opening 524.

During transportation of oil seals, a plurality of oil seals 500 are stacked on one another along the center axis direction. In the case with the oil seal 500 shown in FIG. 3, when a plurality of the oil seals 500 are stacked on one another, the side lips 523 fit in the annular gap between the oil lip 521 and the cylindrical part 511 of the reinforcing ring 510 of adjacent oil seals 500. Thus the plurality of oil seals 500 can be smoothly stacked on one another. However, if the inward flange part 512 of the reinforcing ring 510 is short and the side lip 523 is configured to increase in diameter toward the opposite side from the sealed-fluid side, then the side lip 523, depending on its size, may abut a portion of the reinforcing ring 510 of the adjacent oil seal 500, near the distal end of the cylindrical part 511 of the reinforcing ring 510. In this case, the plurality of oil seals 500 cannot be stacked on one another.

Moreover, if the inward flange part 512 of the reinforcing ring 510 is short, it will be hard to form the annular groove 621 in the body part 620 of the torsional vibration damper 600 for providing a labyrinth structure.

CITATION LIST

Patent Literature

[PTL 1] Japanese Patent Application Laid-open No. 2011-241891

SUMMARY

Technical Problem

An object of the present disclosure is to provide a sealing structure that allows for formation of a side lip, as well as a labyrinth structure between an oil seal and a torsional vibration damper, even when the reinforcing ring has a short inward flange part.

Solution to Problem

The present disclosure adopted the following means to solve the problem noted above.

Namely, the sealing structure of the present disclosure is a sealing structure including a torsional vibration damper having a tubular part to be attached to a crankshaft, and an oil seal that seals an annular gap between an inner circumferential surface of a shaft hole in a housing for the crankshaft to pass through and an outer circumferential surface of the tubular part.

The oil seal includes a reinforcing ring having a cylindrical part, and an inward flange part provided at an end on an opposite side from a sealed-fluid side of the cylindrical part, and a sealing body made of an elastic material and provided integrally with the reinforcing ring.

The reinforcing ring is configured such that a portion on an end face of the inward flange part on the opposite side from the sealed-fluid side is exposed.

The sealing body includes an oil lip extending from near a distal end of the inward flange part toward the sealed-fluid side and slidable on the outer circumferential surface of the tubular part, a dust lip extending from near the distal end of the inward flange part toward the opposite side from the sealed-fluid side and slidable on the outer circumferential surface of the tubular part, and a side lip extending from near the distal end of the inward flange part radially inward and further toward the opposite side from the sealed-fluid side than the dust lip to a position not as far as the outer circumferential surface of the tubular part.

An annular member is further provided, which is fixed to the outer circumferential surface of the tubular part further on the opposite side from the sealed-fluid side than the side lip and covering an outer circumferential surface of the side lip such that there is a gap between the annular member itself and the outer circumferential surface of the side lip.

According to the present disclosure, the side lip extends from near the distal end of the inward flange part of the reinforcing ring radially inward and further toward the opposite side from the sealed-fluid side than the dust lip to a position not as far as the outer circumferential surface of the tubular part of the torsional vibration damper. Therefore, even if the inward flange part of the reinforcing ring is short, the exposed portion on the end face on the opposite side from the sealed-fluid side of the inward flange part will not be blocked by the side lip. Accordingly, when mounting the oil seal, the inward flange part can be pressed directly by a jig or the like. Even when a plurality of oil seals are stacked on one another along the center axis direction, their side lips will not abut a portion of the reinforcing ring of adjacent oil seals, near the distal end of the cylindrical part of the reinforcing ring.

Since an annular member is provided, which covers the outer circumferential surface of the side lip such that there is a gap between the annular member itself and the outer circumferential surface of the side lip, a confined and complex path can be formed from a point on the opposite side from the sealed-fluid side to the sliding part between the dust lip and the outer circumferential surface of the tubular part. Namely, a labyrinth structure can be provided. As described above, according to the present disclosure, even when the reinforcing ring has a short inward flange part, a side lip can be formed, and also a labyrinth structure can be provided between the oil seal and the torsional vibration damper.

Preferably, the annular member may include a cylindrical part fixed to the outer circumferential surface of the tubular part, and a tapered part of which diameter increases from an end on the sealed-fluid side of the cylindrical part toward the sealed-fluid side.

An inner circumferential surface of the tapered part and an outer circumferential surface of the side lip may face each other, with a gap being formed therebetween.

Advantageous Effects of the Disclosure

As described above, according to the present disclosure, even when the reinforcing ring has a short inward flange part, a side lip can be formed, and also a labyrinth structure can be provided between the oil seal and the torsional vibration damper.

DRAWINGS

DETAILED DESCRIPTION

Modes for carrying out this disclosure will be hereinafter illustratively described in detail based on a specific embodiment with reference to the drawings. It should be noted that, unless otherwise particularly specified, the sizes, materials, shapes, and relative arrangement or the like of constituent components described in the embodiment are not intended to limit the scope of this disclosure.

Embodiment

Figure 1:
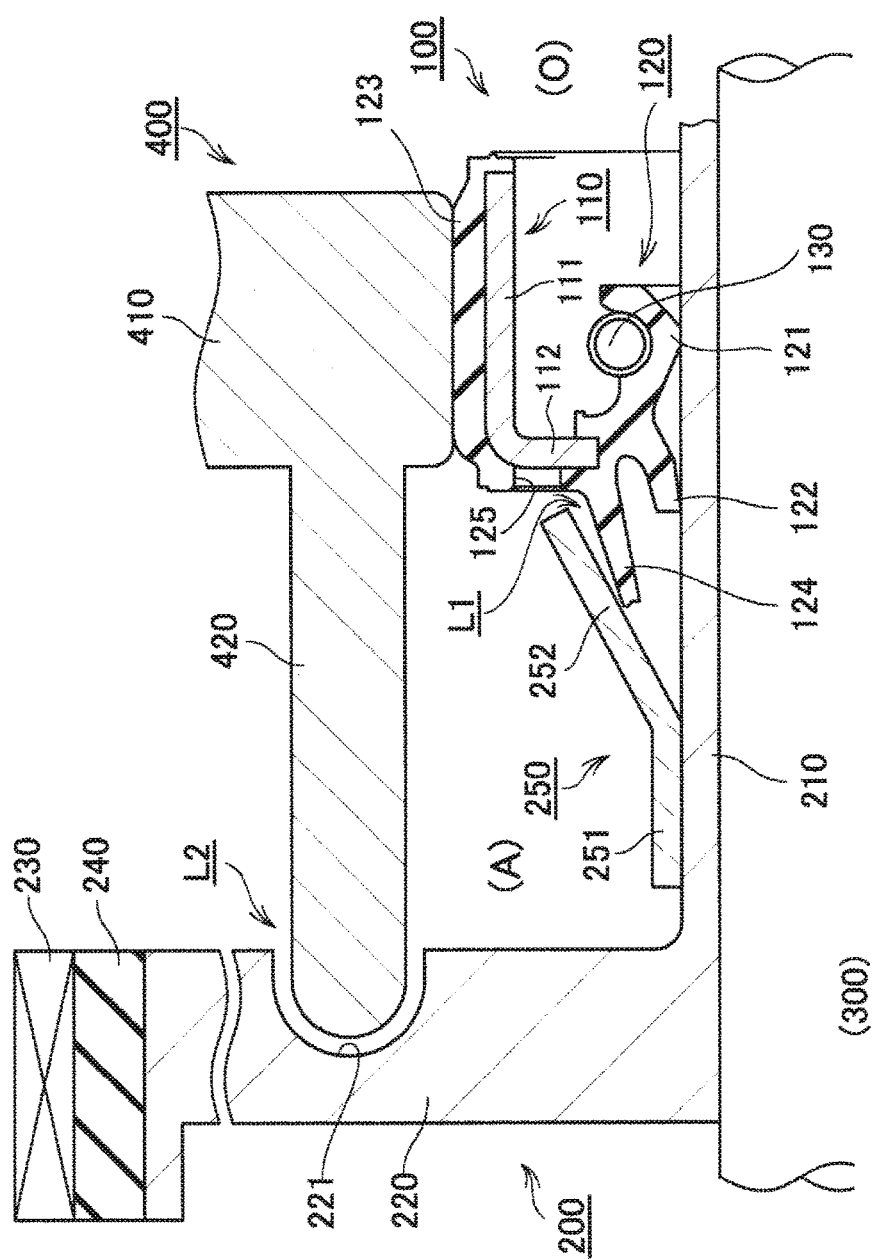
FIG. 1 is a schematic cross-sectional view of a sealing structure according to an embodiment of the present disclosure.
Figure 2:
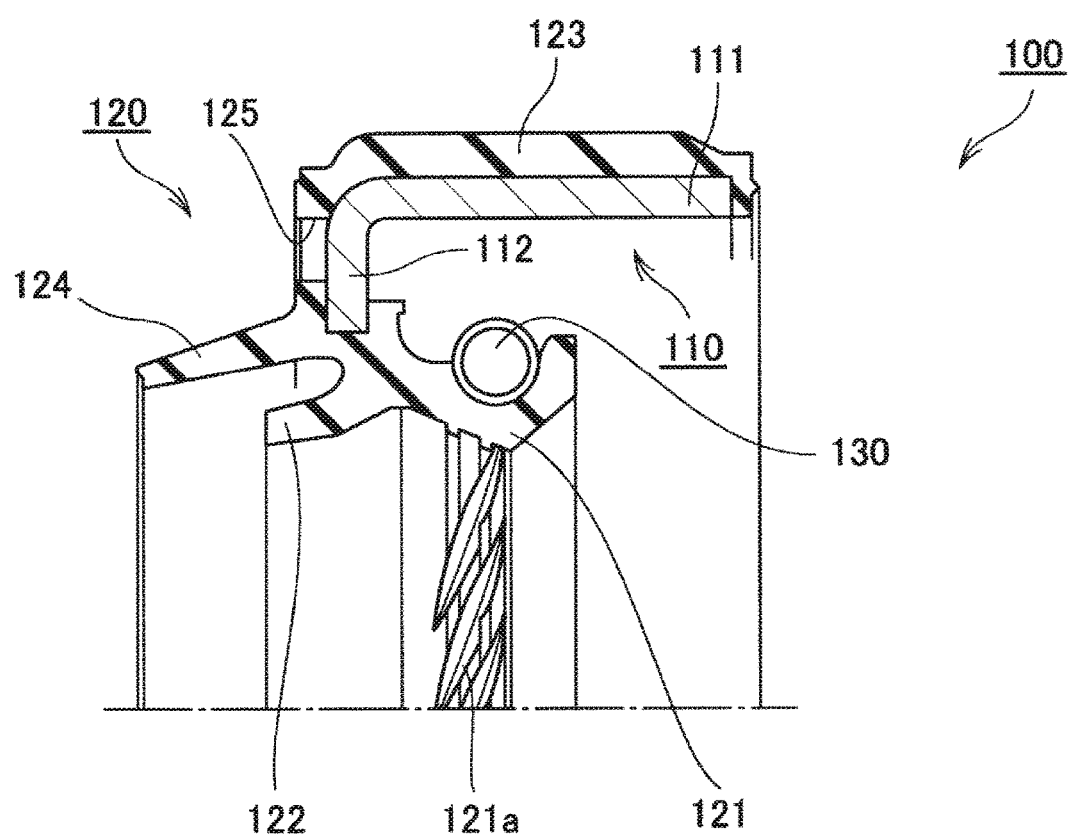
FIG. 2 is a schematic cross-sectional view of an oil seal according to the embodiment of the present disclosure.
Figure 3:
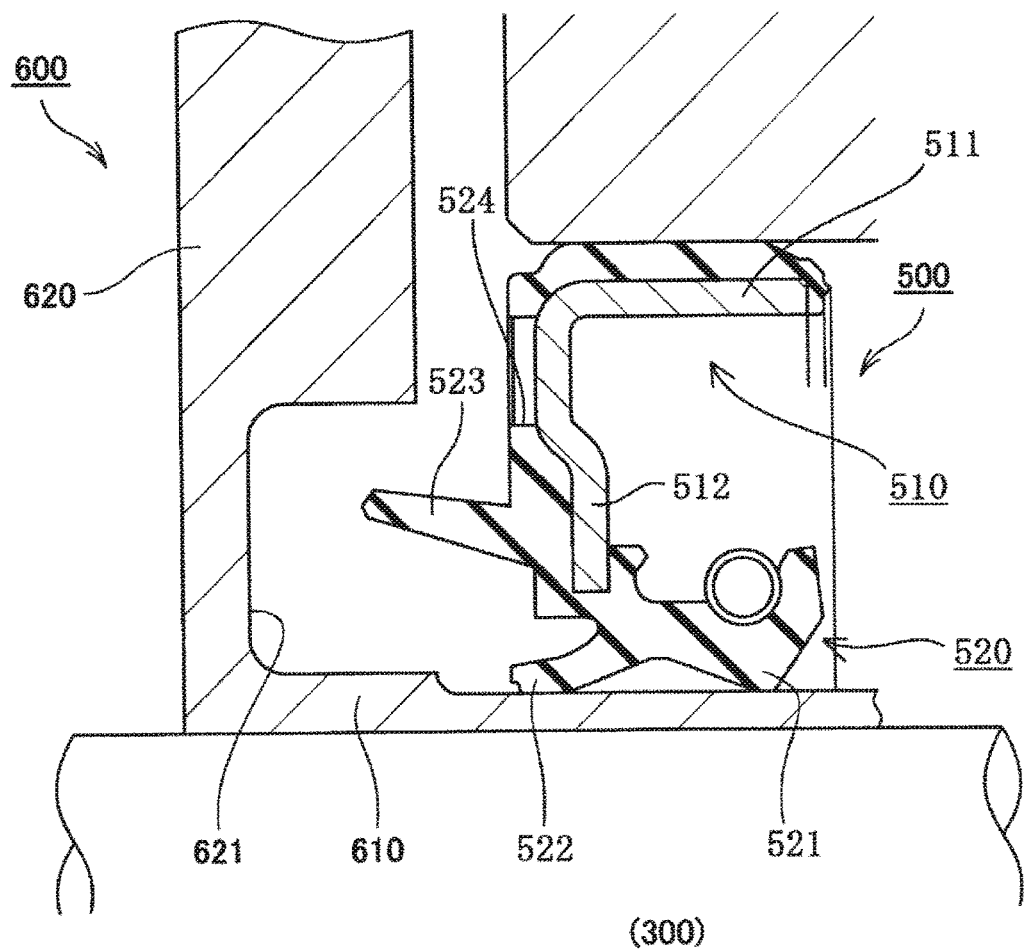
FIG. 3 is a schematic cross-sectional view of a sealing structure according to a prior art example.

The sealing structure according to an embodiment of the present disclosure will be described with reference to FIG. 1 and FIG. 2. FIG. 1 is a schematic cross-sectional view of the sealing structure according to the embodiment of the present disclosure. It is a cross-sectional view of a plane that contains the center axis of a crankshaft. FIG. 1 shows a simplified form of a torsional vibration damper. FIG. 2 is a schematic cross-sectional view of an oil seal according to the embodiment of the present disclosure. It is a cross-sectional view of a plane that contains the center axis of the oil seal, which has a substantially rotationally symmetrical shape.

<Sealing Structure>

The entire configuration of the sealing structure according to this embodiment will be described with reference to FIG. 1 in particular. The sealing structure according to this embodiment includes an oil seal 100, a torsional vibration damper 200 attached to a crankshaft 300, and a front cover 400 as a housing.

The torsional vibration damper 200 is an energy absorbing device attached to the crankshaft 300 for preventing the torsional vibration amplitude from becoming too large. The torsional vibration damper 200 has an annular body part 220 and a cylindrical tubular part 210 on the inner peripheral side of the body part 220 to be attached to the crankshaft 300. An annular weight 230 made of metal, and an annular elastic member 240 made of an elastic material such as rubber for coupling the body part 220 and the annular weight 230 are provided on the outer peripheral side of the body part 220. These annular weight 230 and annular elastic member 240 provide the function of restricting the torsional vibration amplitude of the crankshaft 300.

The oil seal 100 serves the function of sealing an annular gap between the inner circumferential surface of a shaft hole in the front cover 400 for the crankshaft 300 to pass through and the outer circumferential surface of the tubular part 210 of the torsional vibration damper 200. More specifically, the oil seal 100 serves the function of minimizing leakage of oil, which is a fluid to be sealed, from a sealed-fluid side (O) to an air side (A) that is the opposite side from the sealed-fluid side (O), and of minimizing entrance of foreign substances such as dust or dirt from the air side (A) to the sealed-fluid side (O).

<Oil Seal>

The oil seal 100 will be described in more detail with reference to FIG. 1 and FIG. 2. The oil seal 100 includes a metal reinforcing ring 110 and a sealing body 120 made of an elastic material such as rubber and formed integrally with the reinforcing ring 110. The oil seal 100 may be obtained by forming the sealing body 120 by insert molding, with the reinforcing ring 110 as the insert component.

The reinforcing ring 110 includes a cylindrical part 111 and an inward flange part 112 provided at an end on the air side (A) of the cylindrical part 111. The sealing body 120 integrally includes an oil lip 121 and a dust lip 122 that are slidable on the outer circumferential surface of the tubular part 210 of the torsional vibration damper 200, an outer circumferential sealed portion 123 that makes tight contact with an inner circumferential surface of the shaft hole in the front cover 400, and a side lip 124.

The oil lip 121 is formed to extend from near the tip of the inward flange part 112 of the reinforcing ring 110 radially inward and toward the sealed-fluid side (O). A plurality of thread grooves 121a are formed in the inner circumferential surface of the oil lip 121, which provide the pumping effect for returning leaked oil back to the sealed-fluid side (O). In addition, a garter spring 130 is mounted on the outer circumferential side of this oil lip 121 for applying a force radially inward so that the oil lip 121 will not separate from the outer circumferential surface of the tubular part 210. The dust lip 122 is formed to extend from near the tip of the inward flange part 112 radially inward and toward the air side (A).

The side lip 124 according to this embodiment is formed to extend from near the tip of the inward flange part 112 radially inward and further toward the air side (A) than the dust lip 122 to a position not as far as the outer circumferential surface of the tubular part 210.

The sealing body 120 is formed with openings 125. The plurality of openings 125 are circumferentially spaced from each other. As described in conjunction with the background art, the plurality of openings 125 are formed in portions corresponding to support portions (not shown) provided in the metal mold for the positioning purpose during insert molding. These openings 125 expose parts of the end face on the air side (A) of the inward flange part 112 of the reinforcing ring 110.

<Labyrinth Structure>

The labyrinth structure provided in the sealing structure according to this embodiment will be described with reference to FIG. 1 in particular. In this embodiment, a metal annular member 250 is provided on an outer circumferential surface of the tubular part 210 of the torsional vibration damper 200. This annular member 250 is fixed to the outer circumferential surface of the tubular part 210 further on the air side (A) than the side lip 124 and covers an outer circumferential surface of the side lip 124 such that a gap is formed between the annular member 250 itself and the outer circumferential surface of the side lip 124. More specifically, this annular member 250 includes a cylindrical part 251 fixed to the outer circumferential surface of the tubular part 210, and a tapered part 252 of which diameter increases from one end on the sealed-fluid side (O) of this cylindrical part 251 toward the sealed-fluid side (O). The annular member 250 is provided to the tubular part 210 such that the inner circumferential surface of the tapered part 252 and the outer circumferential surface of the side lip 124 face each other, and that there is a gap formed between them.

This way, the gap between the tapered part 252 of the annular member 250 and the side lip 124 forms a confined and complex path from the air side (A) to the sliding part between the dust lip 122 and the outer circumferential surface of the tubular part 210. A first labyrinth structure L1 is thus provided.

In the sealing structure according to this embodiment, the front cover 400 includes an annular protrusion 420 that protrudes from its body part 410 toward the air side (A). An annular groove 221 is provided on the sealed-fluid side (O) of the body part 220 of the torsional vibration damper 200. The annular protrusion 420 of the front cover 400 is arranged such as to extend into this annular groove 221. This way, a confined and complex path is formed from the outer circumferential side to the inner circumferential side of the annular protrusion 420. A second labyrinth structure L2 is thus provided.

As the first labyrinth structure L1 and second labyrinth structure L2 are formed in this way, entrance of foreign substances such as dust or dirt into the sliding part between the dust lip 122 and the outer circumferential surface of the tubular part 210 can be minimized without involving an increase in torque. Thus the sealing function provided by the oil seal 100 can be consistently exhibited for a long time.

<Advantages of the Sealing Structure According to this Embodiment>

According to the sealing structure of this embodiment, the side lip 124 is configured to extend from near the distal end of the inward flange part 112 of the reinforcing ring 110 radially inward and further toward the air side (A) than the dust lip 122 to a position not as far as the outer circumferential surface of the tubular part 210 of the torsional vibration damper 200. Therefore, even if the inward flange part 112 of the reinforcing ring 110 is short, the openings 125 formed in the sealing body 120 will not be blocked by the side lip 124. That is, the exposed portions on the end face on the air side (A) of this inward flange part 112 will not be blocked by the side lip 124. Accordingly, when mounting the oil seal 100, the inward flange part 112 can be pressed directly by a jig or the like. Namely, the oil seal 100 is mounted into the shaft hole in the front cover 400 by being pressed with a jig or the like from the left side of FIG. 1. In this embodiment, the metal inward flange part 112 is pressed directly by a jig or the like through the openings 125, so that the sealing body 120 made of an elastic material will not be damaged or broken.

Even when a plurality of oil seals 100 are stacked on one another along the center axis direction, their side lips 124 will not abut a portion of the reinforcing ring 110 of adjacent oil seals 100, near the distal end of the cylindrical part 111 of the reinforcing ring 110. Therefore, the oil seals 100 according to this embodiment can be stacked on one another along the center axis direction.

In addition, in the sealing structure according to this embodiment, a first labyrinth structure L1 is provided between the annular member 250 provided on the outer circumferential surface of the tubular part 210 of the torsional vibration damper 200 and the side lip 124 of the oil seal 100. Therefore, with the sealing structure according to this embodiment, even when the inward flange part 112 of the reinforcing ring 110 is short, a side lip 124 can be provided, and a labyrinth structure can also be provided between the oil seal 100 and the torsional vibration damper 200. A first labyrinth structure L1 can thus be provided even without providing an annular groove in the torsional vibration damper, which generally involves cumbersome processing. Since it is only necessary to mount (attach) the annular member 250 on the outer circumferential surface of the tubular part 210 according to this embodiment, the production cost can be reduced.

REFERENCE SIGNS LIST

100 Oil seal
110 Reinforcing ring
111 Cylindrical part
112 Inward flange part
120 Sealing body
121 Oil lip
121a Thread groove
122 Dust lip
123 Outer circumferential sealed portion
124 Side lip
125 Opening
130 Garter spring
200 Torsional vibration damper
210 Tubular part
220 Body part
221 Annular groove
230 Annular weight
240 Annular elastic member
250 Annular member
251 Cylindrical part
252 Tapered part
300 Crankshaft
400 Front cover
410 Body part
420 Annular protrusion
L1 First labyrinth structure
L2 Second labyrinth structure

The invention claimed is:

1. A sealing structure comprising:
a torsional vibration damper having a tubular part to be attached to a crankshaft; and
an oil seal that seals an annular gap between an inner circumferential surface of a shaft hole in a housing for the crankshaft to pass through and an outer circumferential surface of the tubular part,
the oil seal including
a reinforcing ring having a cylindrical part, and an inward flange part provided at an end on an opposite side from a sealed-fluid side of the cylindrical part, and
a sealing body made of an elastic material and provided integrally with the reinforcing ring,
the reinforcing ring being configured such that a portion on an end face of the inward flange part on the opposite side from the sealed-fluid side is exposed,
the sealing body including:
an oil lip extending from near a distal end of the inward flange part toward the sealed-fluid side and slidable on the outer circumferential surface of the tubular part;
a dust lip extending from near the distal end of the inward flange part toward the opposite side from the sealed-fluid side and slidable on the outer circumferential surface of the tubular part; and
a side lip extending from near the distal end of the inward flange part radially inward and further toward the opposite side from the sealed-fluid side than the dust lip to a position not as far as the outer circumferential surface of the tubular part, and
the sealing structure further comprising
an annular member fixed to the outer circumferential surface of the tubular part further on the opposite side from the sealed-fluid side than the side lip and covering an outer circumferential surface of the side lip such that there is a gap between the annular member itself and the outer circumferential surface of the side lip.

2. The sealing structure according to claim 1, wherein the annular member includes a cylindrical part fixed to the outer circumferential surface of the tubular part, and a tapered part of which diameter increases from an end on the sealed-fluid side of the cylindrical part toward the sealed-fluid side, and wherein
an inner circumferential surface of the tapered part and an outer circumferential surface of the side lip face each other, with a gap being formed therebetween.

3. The sealing structure according to claim 2, wherein the annular member is made from metal.

* * * * *